United States Patent [19]
Searfoss

[11] Patent Number: 5,829,819
[45] Date of Patent: Nov. 3, 1998

[54] ELECTRIC TARP SYSTEM FOR TRUCK BED

[76] Inventor: Timothy K. Searfoss, 1282 E. M-55, West Branch, Mich. 48661

[21] Appl. No.: 956,574

[22] Filed: Oct. 23, 1997

[51] Int. Cl.⁶ .................................................. B60P 7/04
[52] U.S. Cl. .................................. 296/98; 242/225
[58] Field of Search .............................. 296/98; 242/225

[56] References Cited

U.S. PATENT DOCUMENTS

| | | |
|---|---|---|
| 2,547,079 | 4/1951 | Gerentes . |
| 3,379,906 | 4/1968 | Spohr . |
| 3,546,197 | 12/1970 | Benko et al. . |
| 3,549,199 | 12/1970 | Sibley . |
| 3,628,826 | 12/1971 | Sibley . |
| 3,768,540 | 10/1973 | McSwain ................................. 296/98 |
| 3,868,142 | 2/1975 | Bachand et al. . |
| 4,082,347 | 4/1978 | Petretti . |
| 4,126,351 | 11/1978 | Peteretti . |
| 4,175,247 | 11/1979 | Klemm . |
| 4,292,571 | 9/1981 | Cuneo . |
| 4,299,004 | 11/1981 | Lancaster . |
| 4,516,802 | 5/1985 | Compton ................................. 296/98 |
| 4,529,098 | 7/1985 | Heider et al. ............................ 296/98 |
| 4,609,842 | 9/1986 | Aleem et al. . |
| 4,717,196 | 1/1988 | Adams ..................................... 296/98 |
| 5,031,955 | 7/1991 | Searfoss . |
| 5,090,488 | 2/1992 | Cotton . |
| 5,697,663 | 12/1997 | Chenowth . |

OTHER PUBLICATIONS

Photos entitled "Aero", 3 pages.
Photos entitled "Pulltarps", 2 pages.
Photo entitled "Cramaro", 1 page.
Brochure entitled "Tarping Systems by pioneer cover–all".
Brochure re: "4 modular upgrades that add–on at your convenience".

*Primary Examiner*—Gary C. Hoge
*Attorney, Agent, or Firm*—Brooks & Kushman P.C.

[57] ABSTRACT

A direct-drive actuator assembly actuates a tarp spool for a truck bed tarp system. The direct-drive actuator assembly includes a transmission housing adapted for mounting to the tarp housing. An output shaft extends from the transmission housing for driving the tarp spool. An input shaft is also positioned at least partially within the transmission housing. An electric motor is operatively connected to the input shaft for actuating the tarp spool. A brake is operatively connected to the electric motor for automatically braking the motor when the electric motor is turned off. A cover is provided for enclosing the stacked brake and electric motor against the transmission housing.

20 Claims, 4 Drawing Sheets

ELECTRIC TARP SYSTEM FOR TRUCK BED

TECHNICAL FIELD

The present invention relates to an electric tarp system for a truck bed, and more particularly to a direct-drive actuator assembly for actuating a tarp spool.

BACKGROUND OF THE INVENTION

Many trucks, particularly those hauling loose loads such as sand and gravel, need a truck cover to prevent wind from blowing load particles off the truck bed. Various structures have been devised for covering a truck load. Some such structures include a motor for selectively winding the flexible cover.

It is desirable that the truck cover be easily operated by the truck driver in order to selectively cover and uncover the truck bed from within the truck cab while tightly sealing both the front and rear of the truck bed to prevent wind from passing under the truck cover and disturbing the truck bed contents.

Prior art truck bed covers and related structure are disclosed in U.S. Pat. Nos. 4,516,802; 4,126,351 to Peteratti; 4,082,347 to Peteratti; 3,868,142 to Bachand et al.; 3,546,197 to Sibley; 3,549,199 to Sibley; and 3,628,826 to Sibley.

My U.S. Pat. No. 5,031,955 was the first patent to disclose a direct-drive spool winding system which eliminated problems inherent in chain drives, while reducing the space required for such a drive mechanism.

The direct-drive system disclosed in the '955 patent includes a worm gear for directly rotating the tarp spool. Because the tarp is spring-loaded, the direct-drive system and tarp spool assembly must be operative to automatically lock the tarp in position against the force of the spring when the tarp spool is not rotating. Accordingly, the worm gear design of the '955 patent is effective in automatically locking the tarp spool in position when the actuator motor is turned off. This self-braking configuration is accomplished by the 90° relationship of the worm gear with respect to the drive bolt threads. However, a problem with such a worm gear configuration is that frictional losses reduce efficiency of the system to 66% or less.

Accordingly, it is desirable to provide a direct-drive tarp actuator assembly which has improved efficiency while still providing the automatic self-braking feature.

DISCLOSURE OF THE INVENTION

The present invention overcomes the above-referenced shortcomings of prior art assemblies by providing a direct-drive actuator assembly for actuating a tarp spool for a truck bed tarp system wherein an electric motor is provided for driving a tarp spool through a worm gear transmission system, and wherein the electric motor includes a brake secured thereto for automatically locking the motor against rotation when the motor is deenergized.

More specifically, the present invention provides a direct-drive actuator assembly for actuating a tarp spool for a truck bed tarp system. The direct-drive actuator assembly includes a transmission housing. An output shaft extends from the transmission housing for directly driving the tarp spool. The transmission housing also includes transmission gears therein. An electric motor is operatively connected to the transmission gears for actuating the tarp spool. A brake is operatively connected to the electric motor for automatically braking the motor when the electric motor is turned off.

In a preferred embodiment, a cover is secured to the transmission housing over the electric motor and brake for enclosing the electric motor and brake. A plurality of bolts which connect the brake to the electric motor also connect the cover to the transmission housing.

Preferably, the electric motor and brake are operatively connected such that the brake and electric motor may be deenergized simultaneously so the brake automatically locks the motor to prevent tarp rotation when the motor is switched off.

Another aspect of the invention provides an electric tarp system for covering a truck bed. The system includes a tarp housing adapted for attachment to the truck, and a tarp spool positioned within the tarp housing. A direct-drive actuator assembly, as described above, is directly attached to the tarp housing for directly driving the tarp spool.

Accordingly, an object of the present invention is to provide a direct-drive actuator assembly for actuating a tarp spool, wherein the drive actuator is automatically self-locking, and wherein system efficiency is improved.

A further object of the present invention is to provide a direct-drive actuator assembly for actuating a tarp spool, wherein the direct-drive actuator assembly includes a transmission housing directly mounted to the tarp housing.

A further object of the present invention is to provide a direct-drive actuator assembly for actuating a tarp spool, including an electric motor and brake mounted together in stacked relationship, and enclosed by a cover.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
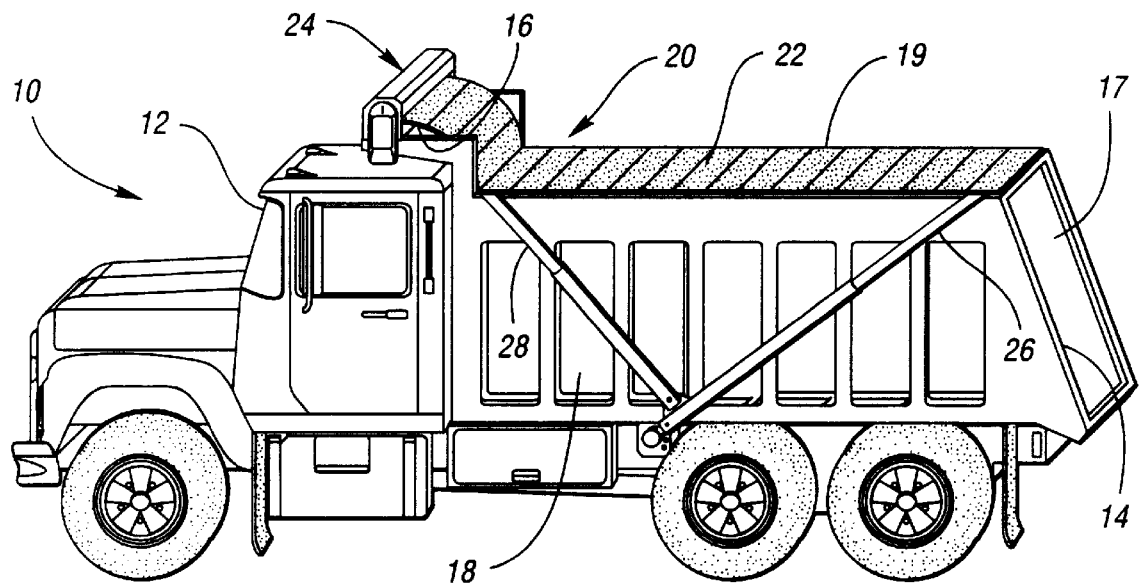
FIG. 1 is a side perspective view of a truck on which an electric tarp system is installed in accordance with the present invention.

As shown in FIG. 1, a truck 10 of a conventional design is illustrated having a cab 12 and a truck bed 14. The truck bed 14 includes front and rear ends 16,17 and first and second sides 18,19.

The subject invention may be utilized on both flat bed trucks and those having raised sides, as illustrated in FIG. 1.

An electric tarp system 20 embodying the principles of the subject invention is illustrated in FIG. 1 on the truck 10 for covering the truck bed 14.

The electric tarp system 20 includes a flexible cover or tarp 22, a winding assembly 24 for winding and storing cover 22, an extension assembly 26 for extending the cover 22 over the truck bed 14, and a tension assembly 28 for applying a downward force on the cover 22 proximate the front end 16 of the truck bed 14.

Figure 2:
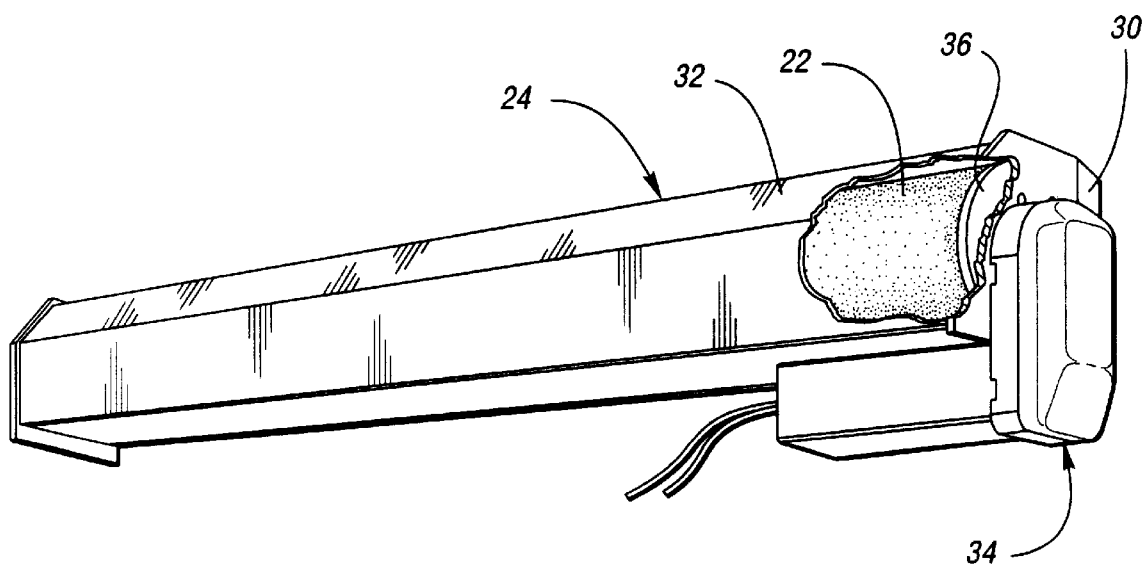
FIG. 2 is a partially cut-away perspective view of a truck cover winding assembly in accordance with the embodiment shown in FIG. 1.

As shown in FIG. 2, the winding assembly 24 includes a tarp housing 30 having a tapered front surface 32 for streamlining the housing 30 and causing wind to flow upward over the assembly 24. The winding assembly 24 also includes a direct-drive actuator assembly 34 for rotatably driving the flexible cover or tarp 22, which is supported on the rotatable spool 36. As shown, the direct-drive actuator assembly 34 is directly connected to the tarp housing 30.

Figure 3:
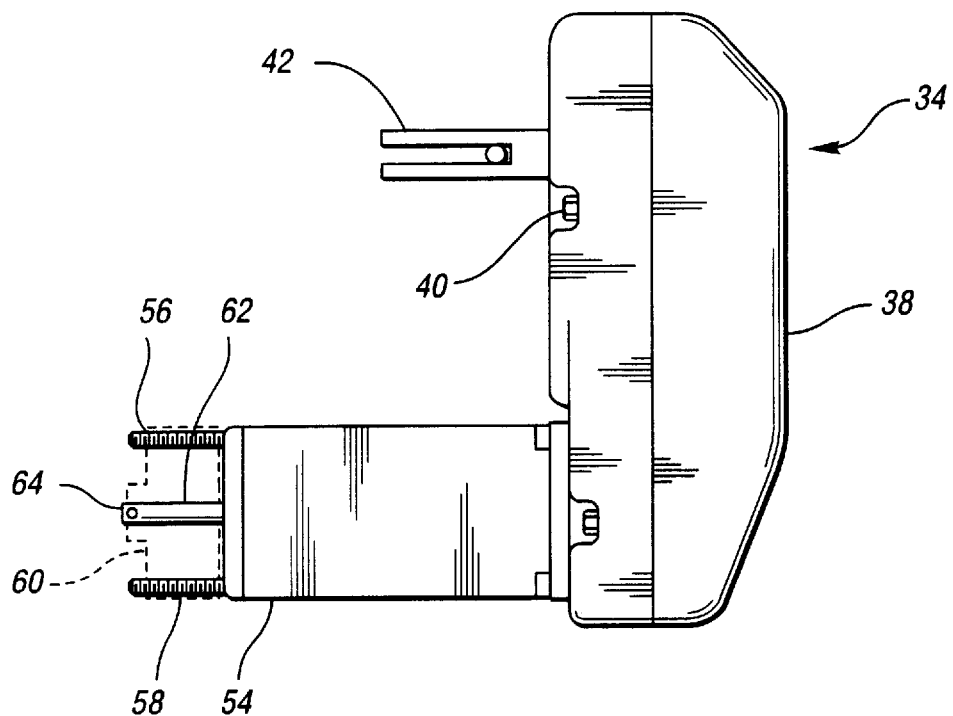
FIG. 3 is a side view of a direct-drive actuator assembly in accordance with the present invention.
Figure 4:
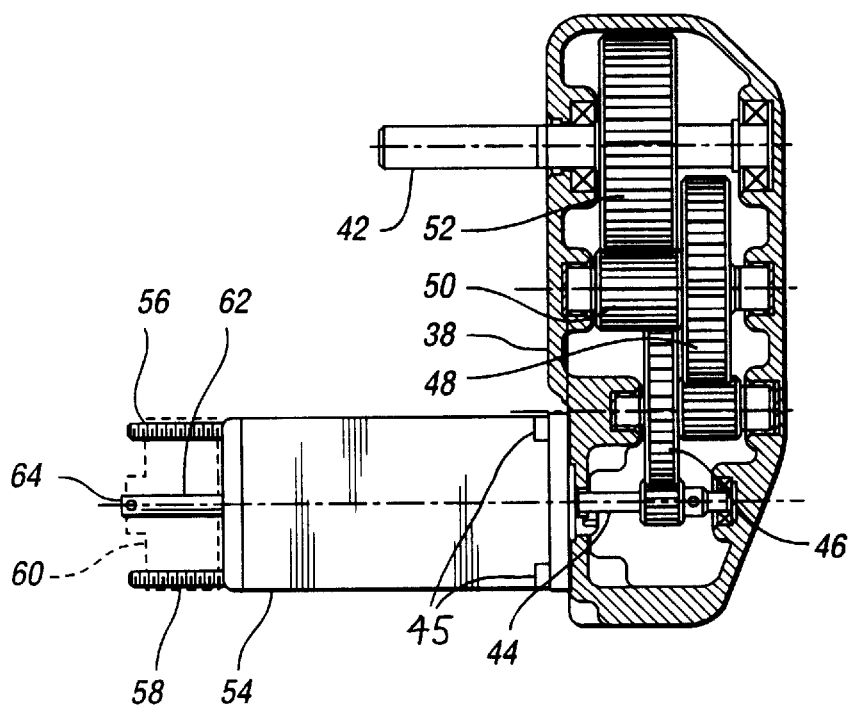
FIG. 4 is a partially disassembled side view of a direct-drive actuator assembly in accordance with the present invention.
Figure 5:
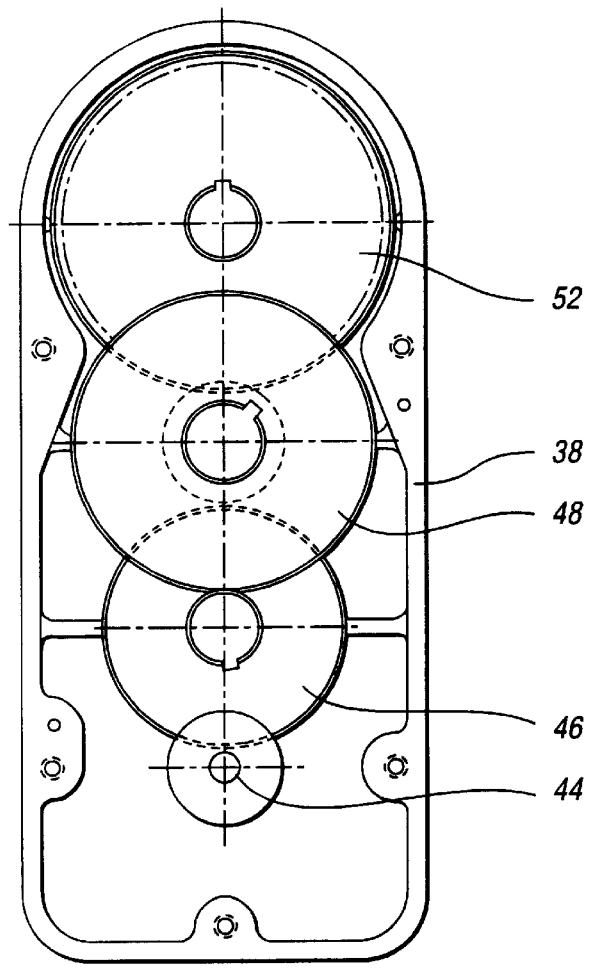
FIG. 5 is a partially disassembled end view of the transmission housing shown in FIG. 4.

Turning to FIGS. 3–5, the direct-drive actuator assembly 34 includes a transmission housing 38 adapted for attachment to the tarp housing 30 by means of the attachment bolts 40. An output shaft 42 extends from the transmission housing 38 for directly driving the tarp spool 36. A motor-driven armature shaft 44 extends into the transmission housing 38. A number of rotatable transmission spur gears 46, 48, 50, 52 are rotatably driven by the armature shaft 44 for actuating rotation of the output shaft 42.

The spur gears 46, 48, 50, 52 provide an approximately 60.9:1 gear reduction ratio, which enables the use of a small DC motor for driving the transmission gears.

The particular spur gear configuration illustrated in FIGS. 4 and 5 is configured to minimize center distance between the armature shaft 44 and the output shaft 42, thereby minimizing overall height of the actuator assembly 34. This spur gear arrangement is approximately 97% efficient in comparison to the prior art design worm gear arrangement which is 66% efficient or less. This efficiency improvement is accomplished by means of reduced frictional losses by using the spur gear arrangement instead of the worm gear arrangement. However, the spur gear arrangement is not self-braking, therefore the present invention provides a novel brake arrangement used in conjunction with the DC electric motor for automatic braking, as described below.

The DC electric motor is operatively connected to the armature shaft 44 for driving the spur gears 46, 48, 50, 52 and the output shaft 42 for tarp movement. The DC motor is preferably a commonly available axial motor, such as a 475 ounce per inch motor available from Redman Motor of Owosso, Mich. The DC motor 54 is directly connected to the transmission housing by bolts 45, shown in FIG. 4, for driving the armature shaft 44 and transmission gears. The DC motor 54 could be connected to the transmission housing 34 by allen head cap screws.

As shown in FIGS. 3, 4, 6 and 7, a brake 60 is secured to the motor shaft 62 for automatically braking the DC motor 54 when deenergized.

Figure 6:
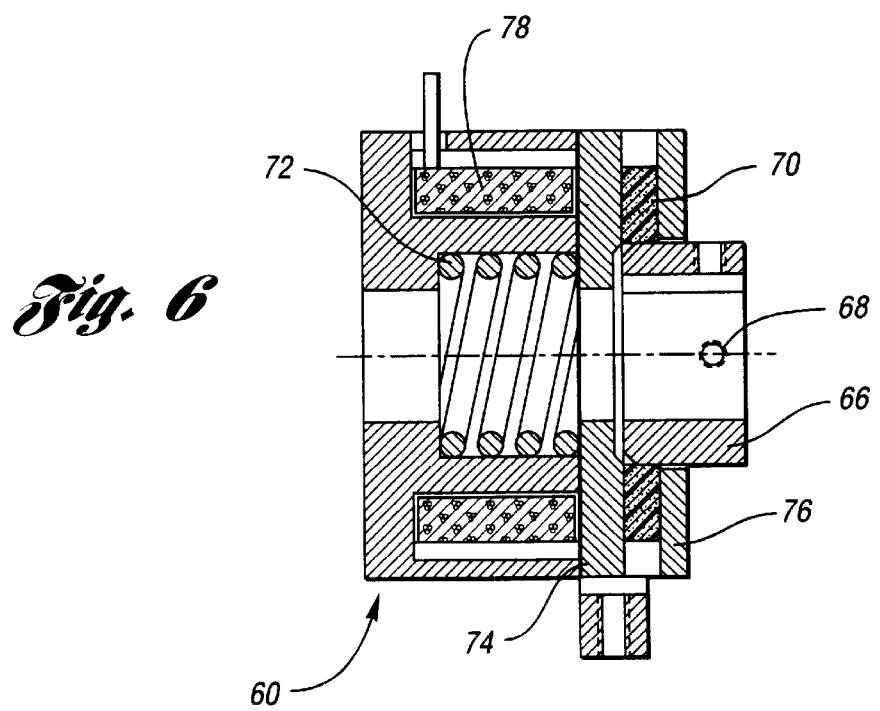
FIG. 6 is a vertical cross-sectional view of a brake for use with the present invention.
Figure 7:
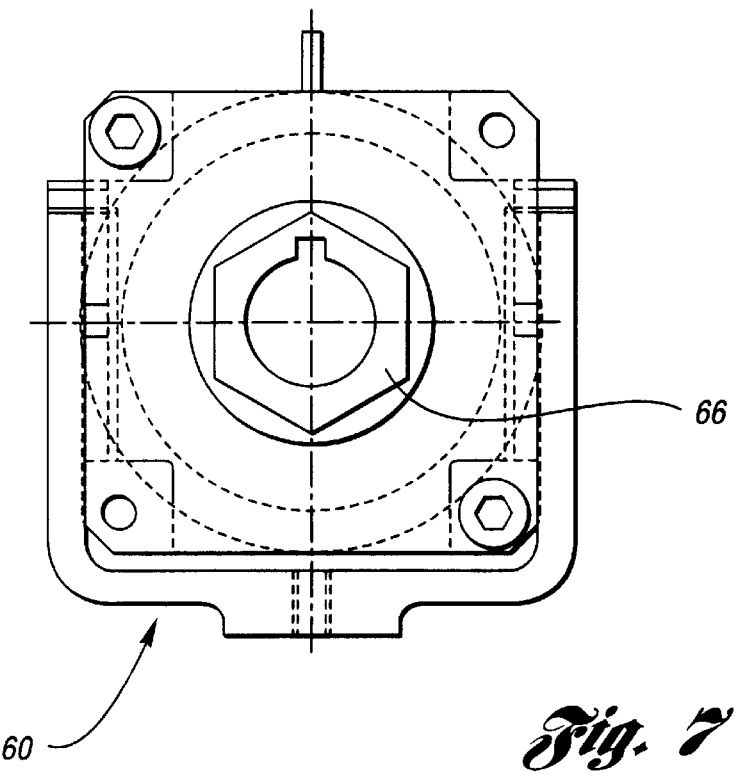
FIG. 7 is an end of the brake shown in FIG. 6.

The preferred brake assembly 60 for use with the present invention, as shown in FIGS. 6 and 7, is a spring-set disc brake, such as that available from Rexnord Corporation of Milwaukee, Wis. This brake is a spring-applied, power-released brake to facilitate automatic locking of the electric motor. The motor shaft 62 includes an aperture 64 formed therein. The motor shaft 62 is inserted into the hub 66, and aperture 64 is aligned with hub aperture 68, and a pin inserted therethrough for engaging the hub 66 and motor shaft 64. As shown in FIG. 7, the hub 66 is hexagonally shaped. A friction disc 70 is secured peripherally about the hexagonally shaped hub 66. A spring 72 applies a braking force against an armature plate 74 for squeezing the friction disc 70 against the pressure plate 76 for braking rotational movement of the motor shaft 62. The armature plate 74 may be biased away from the friction disc 70 against the force of the spring 72 by energizing the coil 78.

Preferably, the brake 60 and DC motor 54 are connected together such that a single switch will actuate the DC motor 54 for causing rotation of the tarp, and the coil 78 of the brake 60 will simultaneously be energized for moving the armature 74 against the force of the spring 72 to eliminate friction upon the friction disc 70 to allow drive shaft 62 rotation. Similarly, when the single switch is turned off, the DC motor 54 is deenergized, and the brake coil 78 is deenergized so that the spring 72 reengages the armature plate 74 against the friction disc 70 to lock the hub 66 and accordingly the drive shaft 62 is prevented from rotating.

Because of the approximately 60:1 gear reduction in the transmission, a substantial amount of braking capacity is provided by providing the brake directly at the drive motor shaft 62. Accordingly, the substantial spring-load acting on the tarp system is automatically overcome when the DC motor 54 and brake coil 70 are simultaneously deenergized to activate the brake 60. Accordingly, the brake 60 is of the spring-applied, power-released type.

Figure 8:
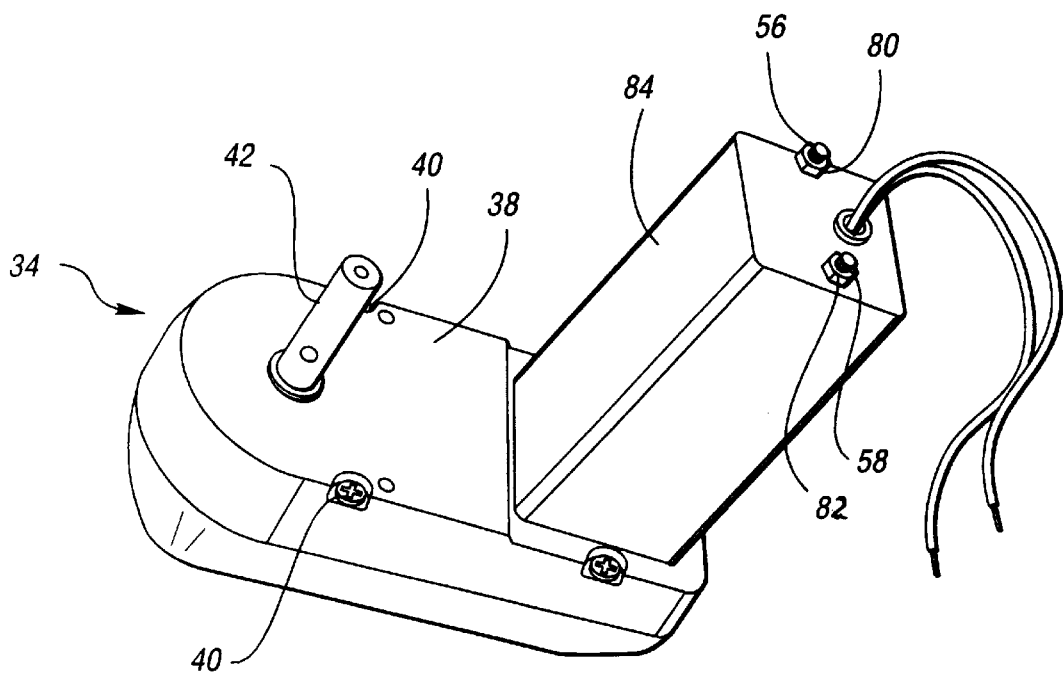
FIG. 8 is a perspective view of a direct-drive actuator assembly in accordance with the present invention.

Turning to FIG. 8, the direct-drive actuator 34 is shown in perspective view. As shown, the bolts 56,58 which attach the brake 60 to the DC motor 54 are also used for connecting a substantially rectangular plastic cover 84 to the transmission housing 38 over the DC motor 34 and brake 60 for enclosing the motor 54 and brake 60. Attachment of the cover 84 is accomplished by means of the nuts 80,82 which are attached to the bolts 56,58, respectively. This plastic cover 84 is highly effective in protecting the DC motor 54 and brake 60 from the effects of chemicals used in power washing of such a truck. The wires shown in FIG. 8 extending from the plastic cover 84 may alternatively be positioned at a bottom portion of the cover 84 to prevent moisture entry and enhance draining. The bolts 56,58 are also operative to hold the motor components together.

The novel stacked configuration of the brake and motor onto the transmission housing, as well as the direct attachment of the transmission housing to the tarp housing cooperate to provide a high efficiency direct-drive actuator assembly which is automatically self-locking and compact in design.

While the best mode for carrying out the invention has been described in detail, those familiar with the art to which this invention relates will recognize various alternative designs and embodiments for practicing the invention within the scope of the appended claims.

What is claimed is:

1. A direct-drive actuator assembly for actuating a tarp spool for a truck bed tarp system, the direct-drive actuator assembly comprising:

a transmission housing having an output shaft for directly driving the tarp spool, and further having transmission gears therein engaging the output shaft;

an electric motor operatively connected to the transmission gears for actuating the tarp spool; and a brake operatively connected to the electric motor for automatically braking the motor when the electric motor is turned off.

2. The direct-drive actuator assembly of claim 1, further comprising:

a plurality of bolts connecting the brake to the motor; and a cover secured to the transmission housing by the plurality of bolts over the electric motor and brake for enclosing the electric motor and brake.

3. The direct-drive actuator assembly of claim 2, wherein the electric motor and brake are disposed along a common axis.

4. The direct-drive actuator assembly of claim 3, wherein the brake is a spring-applied, power-released type brake.

5. The direct-drive actuator assembly of claim 4, wherein the electric motor and brake are electrically connected for single-switch operation such that the brake and electric motor may be energized and deenergized simultaneously.

6. The direct-drive actuator assembly of claim 1, further comprising first and second attachment bolts for securing the transmission housing to the tarp housing.

7. The direct-drive actuator assembly of claim 1, wherein the transmission housing includes a plurality of spur gears therein operatively connected between the input shaft and output shaft, and having approximately a 60:1 gear reduction.

8. The direct-drive actuator assembly of claim 1, wherein the electric motor comprises a DC motor.

9. An electric tarp system for covering a truck bed, the system comprising:

a tarp housing adapted for attachment to the truck;

a tarp spool positioned within the tarp housing;

a transmission housing mounted to the tarp housing, and having an output shaft for directly driving the tarp spool, and further having transmission gears therein engaging the output shaft;

an electric motor operatively connected to the transmission gears for actuating the tarp spool; and a brake operatively connected to the electric motor for automatically braking the motor when the electric motor is turned off.

10. The direct-drive actuator assembly of claim 9, further comprising:

a plurality of bolts connecting the brake to the motor; and a cover secured to the transmission housing by the plurality of bolts over the electric motor and brake for enclosing the electric motor and brake.

11. The direct-drive actuator assembly of claim 10, wherein the electric motor and brake are disposed along a common axis.

12. The direct-drive actuator assembly of claim 11, wherein the brake is a spring-applied, power-released type brake.

13. The direct-drive actuator assembly of claim 12, wherein the electric motor and brake are electrically connected for single-switch operation such that the brake and electric motor may be energized and deenergized simultaneously.

14. The direct-drive actuator assembly of claim 9, further comprising first and second attachment bolts for securing the transmission housing to the tarp housing.

15. The direct-drive actuator assembly of claim 9, wherein the transmission housing includes a plurality of spur gears therein operatively connected between the input shaft and output shaft, and having approximately a 60:1 gear reduction.

16. The direct-drive actuator assembly of claim 9, wherein the electric motor comprises a DC motor.

17. A direct-drive actuator assembly for actuating a tarp spool for a truck bed tarp system, the direct-drive actuator assembly comprising:

a transmission housing having an output shaft for directly driving the tarp spool, and a plurality of transmission gears;

an electric motor operatively connected to the transmission gears for actuating the tarp spool;

a brake operatively connected in a stacked relationship with the electric motor for automatically braking the motor when the electric motor is turned off; and a cover secured to the transmission housing for enclosing the electric motor and brake.

18. The direct-drive actuator assembly of claim 17, wherein the electric motor and brake are disposed along a common axis.

19. The direct-drive actuator assembly of claim 18, wherein the brake is a spring-applied, power-released type brake.

20. The direct-drive actuator assembly of claim 19, wherein the electric motor and brake are electrically connected for single-switch operation such that the brake and electric motor may be energized and deenergized simultaneously.

* * * * *